US010345195B2

(12) United States Patent
Das et al.

(10) Patent No.: US 10,345,195 B2
(45) Date of Patent: Jul. 9, 2019

(54) METHOD AND SYSTEMS FOR DIAGNOSING AN ENGINE

(71) Applicant: General Electric Company, Schenectady, NY (US)

(72) Inventors: Subhas Chandra Das, Bangalore (IN); Ajith Kuttannair Kumar, Erie, PA (US); Shankar Chandrasekaran, Bangalore (IN); Rupam Mukherjee, Bangalore (IN)

(73) Assignee: GE Global Sourcing LLC, Norwalk, CT (US)

( * ) Notice: Subject to any disclaimer, the term of this patent is extended or adjusted under 35 U.S.C. 154(b) by 499 days.

(21) Appl. No.: 15/063,043

(22) Filed: Mar. 7, 2016

(65) Prior Publication Data
US 2017/0254726 A1   Sep. 7, 2017

(51) Int. Cl.
*G01M 15/11* (2006.01)
*F02D 29/06* (2006.01)
*F02D 41/22* (2006.01)
*F02B 63/04* (2006.01)
*F02D 41/00* (2006.01)
(Continued)

(52) U.S. Cl.
CPC ........... *G01M 15/11* (2013.01); *F02B 63/047* (2013.01); *F02D 29/02* (2013.01); *F02D 29/06* (2013.01); *F02D 41/0085* (2013.01); *F02D 41/0097* (2013.01); *F02D 41/22* (2013.01); *G01M 15/12* (2013.01); *B60L 50/10* (2019.02); *F02D 41/1498* (2013.01); *F02D 2041/288* (2013.01); *F02D 2200/101* (2013.01); *F02D 2200/1002* (2013.01); *Y02T 10/40* (2013.01)

(58) Field of Classification Search
CPC .......... B60K 6/46; B60L 11/02; B60W 20/50; B60W 2030/206; F02B 63/047; F02B 75/18; F02D 2041/1432; F02D 2041/2051; F02D 2041/281; F02D 2041/288; F02D 2200/1002; F02D 2200/1004; F02D 2200/1006; F02D 2200/101; F02D 2200/1012; F02D 2250/24; F02D 29/02; F02D 41/0002; F02D 41/0085; F02D 41/0097; F02D 41/1458; F02D 41/1497; F02D 41/1498; F02D 41/22; F02D 41/221; F02D 41/26; F02D 43/04; F02P 5/1512; G01M 15/11; G01M 15/12; Y02T 10/46; Y02T 10/6217
See application file for complete search history.

(56) References Cited

U.S. PATENT DOCUMENTS 5,394,330 A * 2/1995 Horner ................... F02P 5/152
                                              123/473
7,761,223 B2 * 7/2010 Wang .................... F02D 35/023
                                              701/114

(Continued)

*Primary Examiner* — Thomas G Black
*Assistant Examiner* — Ce Li Li
(74) *Attorney, Agent, or Firm* — McCoy Russell LLP (57) ABSTRACT

A system includes a generator coupled to an engine and configured to generate electricity from rotational movement of a shaft of the engine, a sensor configured to measure one or more of a parameter of generator output, engine speed, or engine shaft torque, and a controller configured to detect engine imbalance based on a frequency content of a signal output from the sensor in response to a contribution to the frequency content from another component of the system being less than a threshold value.

15 Claims, 4 Drawing Sheets

(51) Int. Cl.
  *F02D 29/02*  (2006.01)
  *G01M 15/12*  (2006.01)
  *F02D 41/14*  (2006.01)
  *F02D 41/28*  (2006.01)
  *B60L 50/10*  (2019.01)

(56) References Cited

U.S. PATENT DOCUMENTS

| | | | |
|---|---|---|---|
| 8,538,626 B2 | 9/2013 | Kumar et al. | |
| 8,626,371 B2 | 1/2014 | Kumar et al. | |
| 8,626,372 B2 | 1/2014 | Kumar et al. | |
| 8,875,561 B2 | 11/2014 | Worden et al. | |
| 8,984,930 B2 | 3/2015 | Worden et al. | |
| 9,046,050 B2 | 6/2015 | Worden et al. | |
| 9,689,329 B2 * | 6/2017 | Remele | F02D 41/0087 |
| 2003/0209235 A1 * | 11/2003 | Javaherian | F02D 41/0085 |
| | | | 123/674 |
| 2005/0229904 A1 * | 10/2005 | Hagel | F02D 41/1498 |
| | | | 123/436 |
| 2012/0239348 A1 * | 9/2012 | Banerjee | F01D 15/10 |
| | | | 702/183 |
| 2013/0068003 A1 * | 3/2013 | Kumar | F02D 41/0097 |
| | | | 73/114.25 |
| 2013/0073126 A1 * | 3/2013 | Kumar | F02D 41/0097 |
| | | | 701/22 |
| 2013/0073127 A1 * | 3/2013 | Kumar | F02D 41/0097 |
| | | | 701/22 |
| 2013/0073172 A1 | 3/2013 | Worden et al. | |
| 2013/0073174 A1 | 3/2013 | Worden et al. | |
| 2013/0073175 A1 * | 3/2013 | Banerjee | F02D 41/0097 |
| | | | 701/102 |
| 2015/0046059 A1 * | 2/2015 | Kim | G01H 1/003 |
| | | | 701/99 |
| 2017/0241369 A1 * | 8/2017 | Jammoussi | F02B 75/18 |

* cited by examiner

FIG. 4

METHOD AND SYSTEMS FOR DIAGNOSING AN ENGINE

FIELD

Embodiments of the subject matter disclosed herein relate to engines and control of engine-related systems.

BACKGROUND

A multi-cylinder engine includes a plurality of individual cylinders. Each cylinder combusts air and fuel to power the engine. Over time, individual cylinders and/or components coupled to the individual cylinders (e.g., exhaust valves) may become degraded. Further, because fueling may be individually controlled for each cylinder, fueling may become uneven between all the cylinders of the engine. If individual cylinders are not being fueled accurately (e.g., amount or timing of fuel injection), or cylinders become degraded, engine misfire may occur and/or the efficiency of the engine may decrease. Further, if the output of the cylinders varies such that the cylinders are unbalanced, this may put stress on engine components, such as the crankshaft, bearings, and/or cylinder connecting rods. While some engines may utilize individual cylinder pressure sensors for measuring in-cylinder pressure for cylinder balancing purposes, this may increase engine component costs, increase control complexity, and increase unreliability of in-cylinder pressure sensors exposed to high combustion gas pressures and temperatures.

BRIEF DESCRIPTION

In an embodiment, a system includes a generator coupled to an engine and configured to generate electricity from rotational movement of a shaft of the engine, a sensor configured to measure one or more of a parameter of generator output, engine speed, or engine shaft torque, and a controller configured to detect engine imbalance based on a frequency content of a signal output from the sensor in response to a contribution to the frequency content from another component of the system being less than a threshold value.

In this way, engine imbalance may be detected based on output from a sensor that measures a parameter indicative of generator output, such as the DC link voltage from the rectifier, engine speed, engine shaft torque, or alternator output voltage. By doing so, engine imbalance due to a degraded cylinder or fueling errors may be identified without the use of additional sensors, thus lowering the cost and complexity of the system. However, the DC link voltage may be coupled to various loads, such as the traction motors (via one or more inverters), and these downstream loads may affect the DC link voltage. The sources that contribute to the DC link voltage signal output from the DC link voltage sensor may be identified, and the detection of the imbalance may be performed when the sources are not contributing to the voltage and/or the detection may be adjusted to account for the additional content to the voltage signal by the other system components, thus lowering false positive indications and improving the fidelity of the detection.

In some examples, other sensor outputs may be analyzed to detect engine imbalance, such as an output from an engine speed sensor, an output from an engine shaft torque sensor, and/or alternator output voltage. As described above, these sensors may also experience contributions to their respective frequency components from sources other than engine imbalance, and thus these sources may be identified and the engine imbalance determination may be adjusted or delayed when the identified sources are determined to be contributing to the frequency content of the additional sensors. In doing so, false positive indications of engine imbalance may be avoided.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to systems and methods for control of engine-related systems, e.g., for control of an engine or a system related to the engine based on a diagnosis of the engine. Furthermore, embodiments of the subject matter disclosed herein use engine and/or generator data, such as measured generator electrical parameters or generator data (e.g., DC link voltage, engine speed, engine shaft torque, alternator output voltage) derived from measured generator electrical parameters and/or engine parameters (e.g., speed), to diagnose conditions of an engine or auxiliary equipment and to distinguish between conditions and associated engine components and auxiliary equipment.

The engine may be included in a vehicle, such as a locomotive system. Other suitable types of vehicles may include on-highway vehicles, and off-highway vehicles other than locomotives, such as mining equipment, aircraft, and marine vessels. Other embodiments of the invention may be used for stationary engines such as wind turbines or power generators. The engine may be a diesel engine, or may combust another fuel or combination of fuels. Such alternative fuels may include gasoline, kerosene, biodiesel, natural gas, and ethanol—as well as combinations of the foregoing. Suitable engines may use compression ignition and/or spark ignition.

Figure 1:
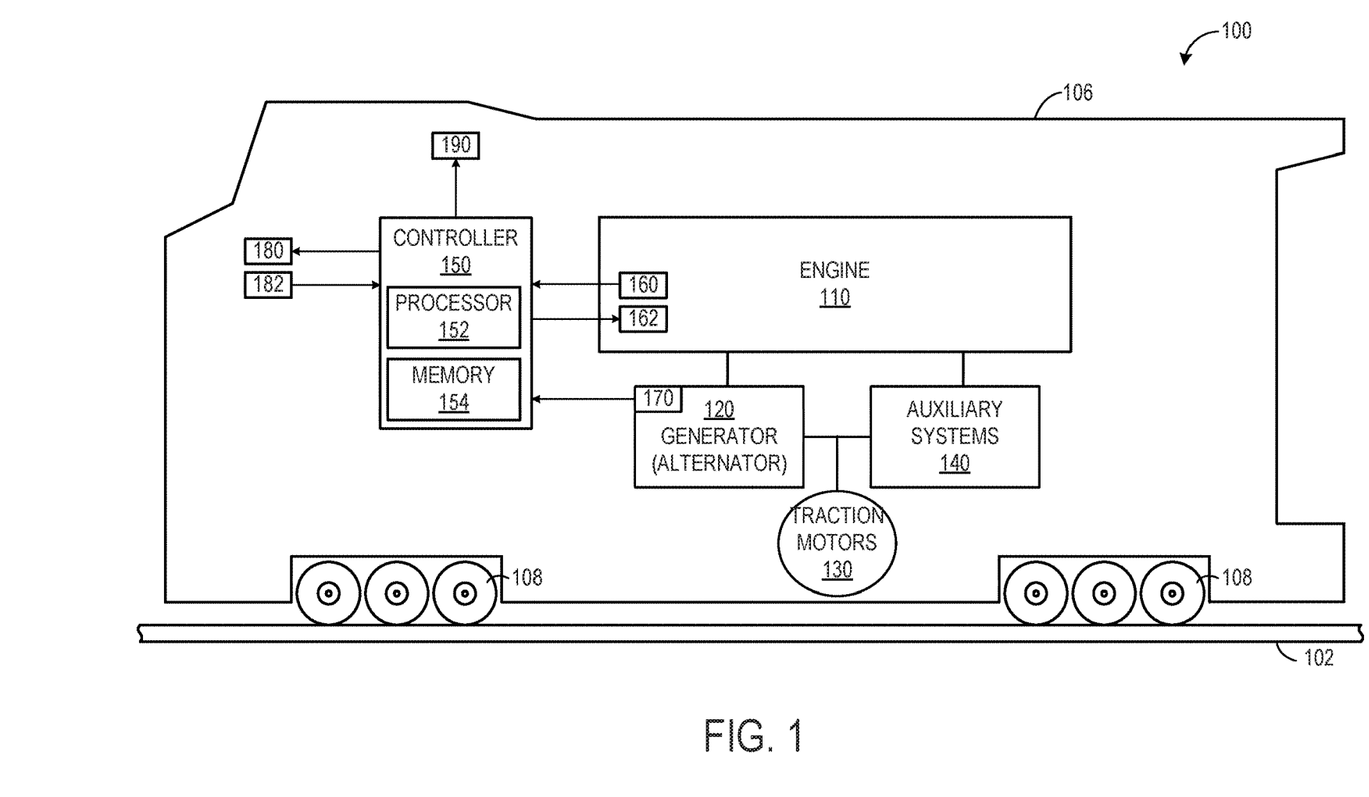
FIG. 1 shows an embodiment of a vehicle system.

FIG. 1 is an illustration of an embodiment of a vehicle system 100 (e.g., a locomotive system) herein depicted as a rail vehicle 106 configured to run on a rail 102 via a plurality of wheels 108. As depicted, the rail vehicle 106 includes an engine 110 operatively connected to a generator (alternator) 120. The engine 110 receives intake air for combustion from an intake passage. The engine may include a plurality of cylinders, and each cylinder may be configured to combust intake air and fuel. Exhaust gas resulting from combustion in the engine 110 is supplied to an exhaust passage. Exhaust gas flows through the exhaust passage, and out of an exhaust stack of the vehicle 106. The vehicle 106 also includes traction motors 130 operatively connected to the generator 120 for driving the wheels 108. The vehicle 106 further includes various auxiliary systems or equipment 140 operatively connected to the generator 120 or the engine 110 (e.g., the rotatable engine shaft 111, see FIG. 2) for performing various functions. The generator may include secondary coils that drive the auxiliary systems, where the main coils of the generator are used to drive the traction motors, in one embodiment.

The vehicle 106 further includes a controller 150 to control various components related to the vehicle system 100. In one example, controller 150 includes a computer control system. In one embodiment, the computer control system is largely software based and includes a processor, such as processor 152, configured to execute computer operable instructions. The controller 150 further includes computer readable storage media stored in memory 154 including code for enabling on-board monitoring and control of rail vehicle operation. The controller 150 may include multiple engine control units (ECU) and the control system may be distributed among each of the ECUs. The controller 150 further includes computer readable storage media, such as memory 154, including instructions (e.g., computer executable instructions) for enabling on-board monitoring and control of rail vehicle operation. Memory 154 may include volatile and non-volatile memory storage. In accordance with another embodiment, the controller may be hardware based using, for example, digital signal processors (DSPs) or other hardware logic circuitry to perform the various functions described herein.

The controller may oversee control and management of the vehicle system 100. The controller may receive signals various engine sensors 160, such as an engine speed sensor, or from various generator sensors 170 to determine operating parameters and operating conditions, and correspondingly adjust various engine actuators 162, such as traction motors, alternator, cylinder valves, throttle, etc., to control operation of the rail vehicle 106. In accordance with an embodiment, the engine speed sensor includes a multi-tooth pick-up wheel connected to the engine shaft 111, and a reluctance sensor for sensing when a tooth of the pick-up wheel passes by the reluctance sensor.

The controller may receive signals representing various generator parameters from various generator sensors. The generator parameters can include a dc-link voltage, a dc-link current, a generator field voltage, a generator field current, a generator output voltage, and a generator output current. Other generator parameters may be possible as well, in accordance with various embodiments. Correspondingly, the controller may control the vehicle system by sending commands to various components such as traction motors, alternator, cylinder valves, throttle, etc. Signals from generator sensors 170 may be bundled together into one or more wiring harnesses to reduce space in vehicle system 100 devoted to wiring and to protect the signal wires from abrasion and vibration. The controller may also receive signals from an alternator voltage sensor and/or an engine shaft torque sensor.

The controller may include onboard electronic diagnostics for recording operational characteristics of the engine. Operational characteristics may include measurements from sensors 160 and 170, for example. In one embodiment, the operational characteristics may be stored in a database in memory 154. In one embodiment, current operational characteristics may be compared to past operational characteristics to determine trends of engine performance.

The controller may include onboard electronic diagnostics for identifying and recording potential degradation and failures of components of vehicle system 100. For example, when a potentially degraded component is identified, a diagnostic code may be stored in memory 154. In one embodiment, a unique diagnostic code may correspond to each type of degradation that may be identified by the controller. For example, a first diagnostic code may indicate a problem with cylinder 1 of the engine, a second diagnostic code may indicate a problem with cylinder 2 of the engine, a third diagnostic code may indicate a problem with one of the auxiliary systems, etc.

The controller may be further linked to display 180, such as a diagnostic interface display, providing a user interface to the locomotive operating crew and a maintenance crew. The controller may control the engine, in response to operator input via user input controls 182, by sending a command to correspondingly adjust various engine actuators 162. Non-limiting examples of user input controls 182 may include a throttle control, a braking control, a keyboard, and a power switch. Further, operational characteristics of the engine and auxiliary equipment, such as diagnostic codes corresponding to degraded components, may be reported via display 180 to the operator and/or the maintenance crew.

The vehicle system may include a communications system 190 linked to the controller. In one embodiment, communications system 190 may include a radio and an antenna for transmitting and receiving voice and data messages. For example, data communications may be between the vehicle system and a control center of a railroad, another locomotive, a satellite, and/or a wayside device, such as a railroad switch. For example, the controller may estimate geographic coordinates of the vehicle system using signals from a GPS receiver. As another example, the controller may transmit operational characteristics of the engine and/or auxiliary equipment to the control center via a message transmitted from communications system 190. In one embodiment, a message may be transmitted to the command center by communications system 190 when a degraded component of the engine or auxiliary equipment is detected and the vehicle system may be scheduled for maintenance.

Figure 2:
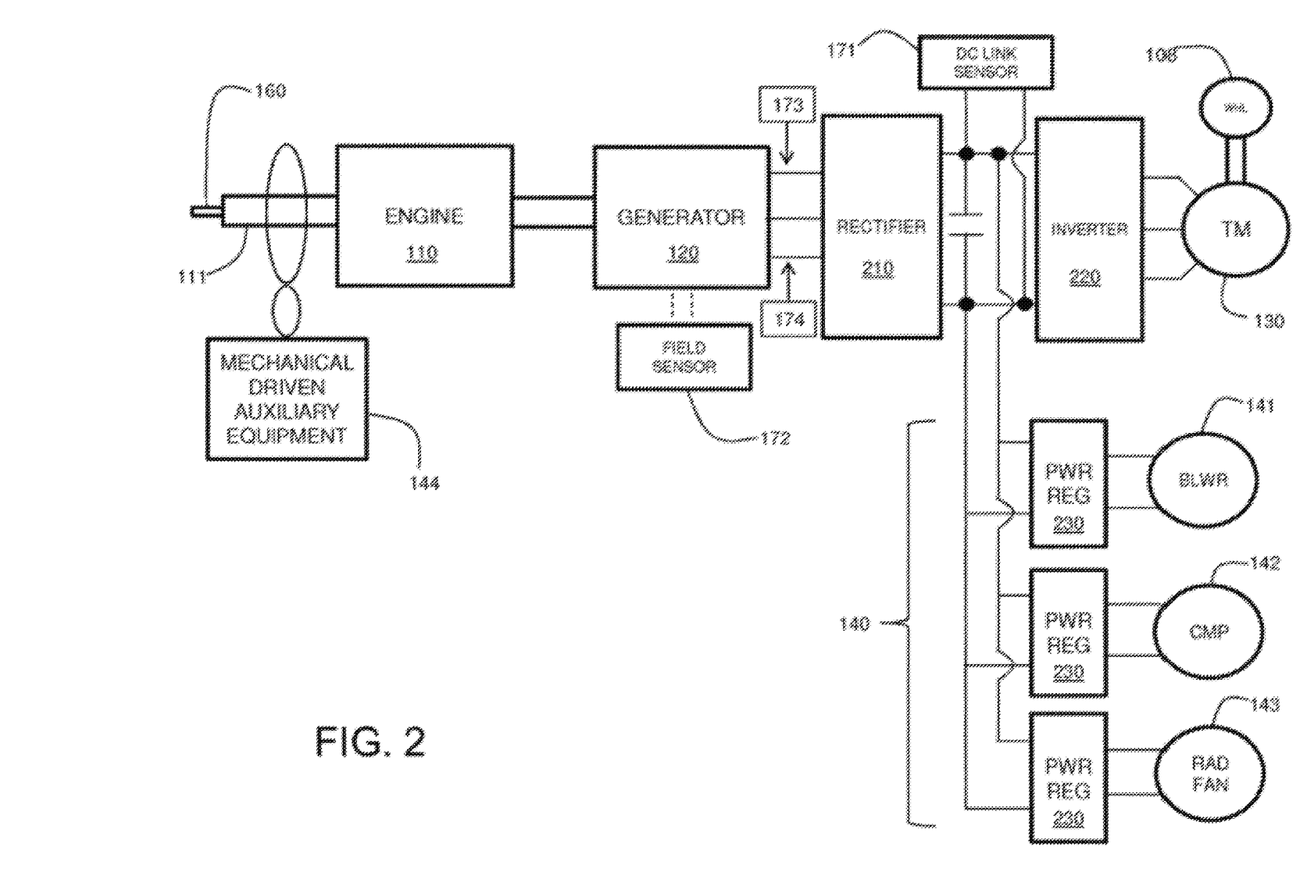
FIG. 2 shows an embodiment of the engine and generator of FIG. 1 operatively connected to various auxiliary equipment and traction motors.

FIG. 2 is an illustration of an embodiment of the engine 110 and generator 120 of FIG. 1 operatively connected to various auxiliary equipment 140 (141, 142, 143, 144) and traction motors 130. Various mechanical auxiliary equipment 144 may be operatively coupled to and driven by the rotating engine shaft 111. Other auxiliary equipment 140 are driven by the generator 120 through a rectifier 210 that produces a dc-link voltage to power regulators 230. Examples of such auxiliary equipment include a blower 141, a compressor 142, and a radiator fan 143, an alternator, etc. The traction motors 130 are driven by the generator 120 through the rectifier 210 that produces a dc-link voltage to an inverter 220. In accordance with certain embodiments, the generator 120 may actually be one or more generators such as, for example, a main generator to drive the traction motors 130 and an auxiliary generator to drive a portion of the auxiliary equipment 140. Further examples of auxiliary equipment include turbochargers, pumps, and engine cooling systems.

The speed sensor 160 measures the speed of the rotating shaft 111 of the engine during operation. The dc-link sensor 171 is a generator sensor and can measure dc-link voltage, dc-link current, or both, in accordance with various embodiments. The field sensor 172 is a generator sensor and can measure field current of the generator, field voltage of the generator, or both, in accordance with various embodiments. In accordance with certain embodiments, generator sensors 173 and 174 are provided for measuring the armature output voltage and current of the generator, respectively.

In accordance with an embodiment, the frequency content of a generator parameter is used to diagnose a condition of the engine. A generator parameter (e.g., the dc-link voltage) is measured using the dc-link sensor 171 and is sent to the controller 150. Other generator parameters may be used instead, including the dc-link current, the generator field voltage, the generator field current, the generator output voltage, and the generator output current. In other examples, the engine speed and/or engine shaft torque may additionally or alternatively be measured. The controller 150 samples the generator parameter (and/or engine speed and shaft torque) over time and performs a frequency analysis process on the sampled data. In accordance with one embodiment, the frequency analysis process is a Fourier transform process (e.g., a Fast Fourier Transform, FFT, process). In accordance with another embodiment, the frequency analysis process is a bandpass filtering process. The frequency analysis process transforms the sampled time domain generator parameter into frequency content in the frequency domain. The various frequency components of the frequency content can include fundamental (first order) and harmonic (second order, half order, third order, etc.) frequency components. In accordance with an embodiment, the Fourier Transform process and the bandpass filtering process include computer executable instructions that are executed by the processor 152. The frequency transformation can be performed on processed/derived signals such as, for example, kilovolt-amps (kVA) or kilowatts (kW) which are the product of current and voltage, or torque which is kW/frequency of the signal.

For example, the engine may have a plurality of cylinders that fire in a predefined sequence, where each cylinder fires once during a four stroke or a two stroke cycle. For example, a four cylinder, four stroke engine may have a firing sequence of 1-3-4-2, where each cylinder fires once for every two revolutions of the engine. Thus, the firing frequency of a given cylinder is one half the frequency of revolution of the engine and the firing frequency of the engine (e.g., where any one of the cylinders of the engine is firing) is twice the frequency of revolution of the engine. The frequency of revolution of the engine may be described as the first engine order. Such a first order frequency component can show up in the frequency content of the measured generator parameter. The firing frequency of a given cylinder of a four stroke engine may be described as the half engine order, where the half engine order is one half the frequency of revolution of the engine. Such a half order frequency component can also show up in the frequency content of the measured generator parameter.

As another example of a four stroke engine, a twelve cylinder engine may have a firing sequence of 1-7-5-11-3-9-6-12-2-8-4-10, where each cylinder fires once for every two revolutions of the engine. Thus, the firing frequency of a given cylinder is one half the frequency of revolution of the engine and the firing frequency of the engine is six times the frequency of revolution of the engine. As an example of a two stroke engine, a twelve cylinder engine may have a firing sequence of 1-7-5-11-3-9-6-12-2-8-4-10, where each cylinder fires once for every revolution of the engine. Thus, the firing frequency of a given cylinder is the frequency of revolution of the engine and the firing frequency of any cylinder is twelve times the frequency of revolution of the engine. Again, these frequency components can show up in the frequency content of the measured generator parameter.

For example, the engine may be a four stroke engine operating at 1050 RPM. Thus, the first engine order is at 17.5 Hz and the half engine order is at 8.75 Hz. The dc-link voltage may vary with a periodic frequency as the engine shaft 111 rotates during operation. For example, the frequency content of the dc-link voltage may include a frequency component at the frequency of the first engine order. In other words, the peak magnitude of the frequency content may occur at the first-order frequency component. The dc-link voltage may also include frequency content at other harmonics of the first-order frequency, such as at a second-order frequency (twice the engine frequency), a third-order frequency (three times the engine frequency), etc. Similarly, the dc-link voltage may include frequency content at frequencies less than the first-order frequency, such as at a half-order frequency (half the engine frequency).

Figure 3:
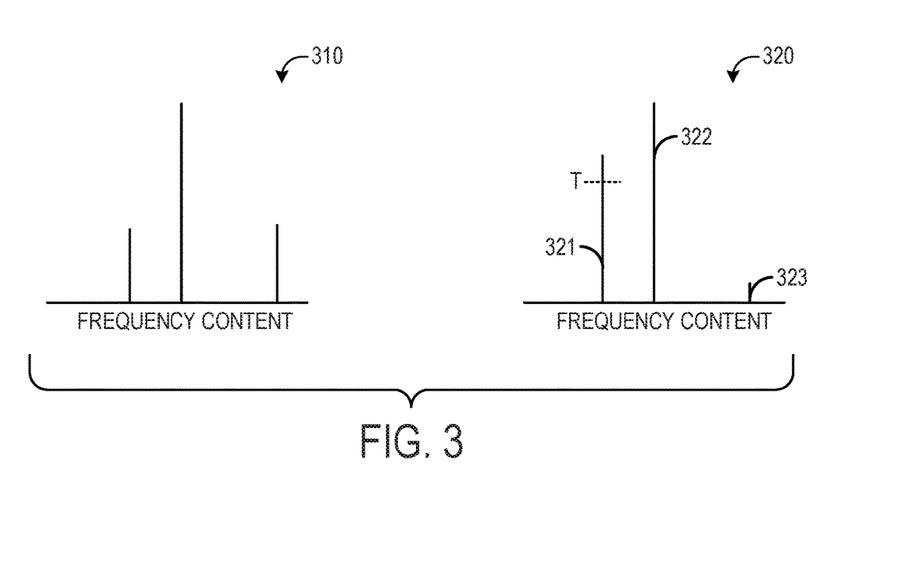
FIG. 3 is a diagram illustrating examples of frequency content of a signal output from a sensor configured to measure a parameter of generator output.

For an engine that is "healthy" and is operating properly, the frequency content of the measured generator parameter can have a particular healthy signature. Deviations from such a healthy signature can indicate a problem with the engine. For example, in accordance with an embodiment, a condition of an engine may be diagnosed by analyzing a half order and/or first order magnitude and/or phase of the frequency content. FIG. 3 is an illustration showing embodiments of "healthy" and "unhealthy" frequency content. The frequency content 310 of the healthy engine (e.g., an engine that is operating properly) has three frequency components of absolute and relative magnitudes as shown in FIG. 3, in accordance with an embodiment. The frequency content 320 of the unhealthy engine (e.g., an engine that is not operating properly due to some degradation or failure) has three frequency components at the same locations as in the frequency content 310 for the healthy engine. However, the amplitude of one frequency component 321 (e.g., a half order component) is distorted (e.g., increased in amplitude), and the amplitude of another frequency component 323 (e.g., a second order component) is also distorted (e.g., decreased in amplitude), in accordance with an embodiment. In one embodiment, the distorted half order component 321 is indicative of an unhealthy engine and is identified by comparing the amplitude of the half order component to a threshold value.

In accordance with another embodiment, both distorted frequency components 321 and 323 in the frequency content 320 are indicative of an unhealthy engine. Furthermore, the particular characteristics of the distorted frequency components (e.g., amplitude) relative to the other frequency components in the frequency content 320 of the unhealthy engine can be indicative of a particular type of engine degradation or failure (e.g., cylinder number 3 of the engine is inoperable). Also, the phase of the half order component, with respect to a reference cylinder (e.g., cylinder number 1), can be used to isolate a problem to a particular cylinder.

The degraded components may cause the engine to operate less efficiently, with less power, and/or with more pollution, for example. Further, the condition of the degraded components may accelerate degradation of the components which may increase the likelihood of catastrophic engine failure and road failure. A degraded engine cylinder is an example of a degraded engine component. Thus, for a four-stroke engine, the distorted frequency component may occur at the half-order frequency. For a two-stroke engine, the distorted frequency component may occur at the first-order frequency. The diagnosis, then, may include both a warning of degradation as well as an indication of the type and/or location of the degraded engine component.

A diagnostic logic in the controller 150 may detect an unhealthy condition in the frequency content of a generator parameter. For example, the half order component 321 may be compared to a threshold level T by the diagnostic logic. If the magnitude of the component 321 exceeds the threshold level T, then the diagnostic logic determines that degradation in the engine has occurred. Furthermore, if the diagnostic logic determines that the ratio of the half order component 321 to the first order component 322 exceeds a second threshold level, and the ratio of the first order component 322 to the second order component 323 exceeds a third threshold level, then the diagnostic logic isolates the degradation to a particular engine component (e.g., cylinder number 3). In accordance with an embodiment, the diagnostic logic includes computer executable instructions that are executed by the processor 152. In accordance with an embodiment, the ratio of a half order component to a dc or zero order component can be indicative of an engine problem. Furthermore, the threshold level T can be dependent on an operating condition of the engine such as, for example, power, speed, ambient conditions, repair history, etc.

Types of engine degradation or failures that can be diagnosed, distinguished, and isolated may include a worn out ignition plug, a fuel imbalance, a faulty cylinder, a knocking in the engine, a low fuel input, a low compression, and a valve train failure, for example. Once a degradation or failure is diagnosed, an action can be taken. Such actions may include, for example, providing a warning signal to the operator (e.g., via the display 180), adjusting an engine operating parameter (e.g., derating the engine power, shutting down at least one cylinder of the engine, shutting down the engine entirely, balancing cylinders of the engine), logging a maintenance action, and transmitting the diagnosed condition to a central location (e.g., via the communications system 190).

Figure 4:
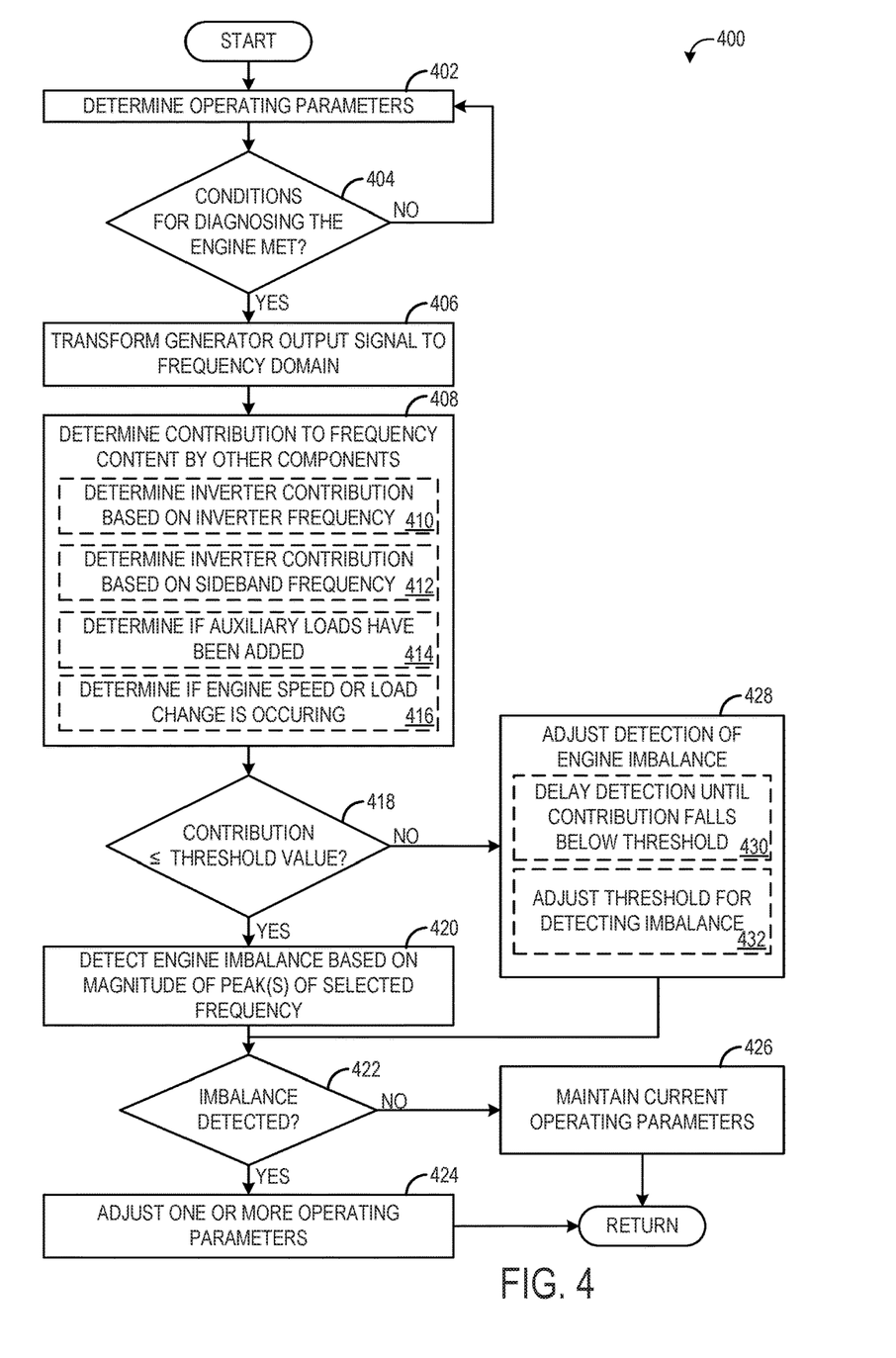
FIG. 4 is a flow chart illustrating a method for diagnosing an engine, according to an embodiment.

Turning now to FIG. 4, a method 400 for diagnosing an engine degradation is presented. Method 400 may be carried out according to instructions stored in memory of a controller, such as controller 150 of FIGS. 1-2 in order to diagnose an engine conditions, such as a misfiring cylinder, based on output from a sensor configured to measure a parameter of generator output, such as DC link sensor 171. If misfire or other engine degradation is detected, method 400 may adjust one or more operating parameters to mitigate the source of degradation, such as adjusting fuel injection amounts to the degraded cylinder.

At 402, method 400 determines engine system operating parameters. The determined operating parameters include, but are not limited, engine speed, engine load, generator load, auxiliary load status, traction motor speed, and other parameters. At 404, method 400 includes determining if conditions for diagnosing the engine have been met. As explained above with respect to FIGS. 2 and 3, and explained in more detail below, degradation of the engine may be detected based on a parameter of generator output, such as the DC link voltage. For example, the frequency content of the voltage signal output by the DC link voltage sensor may be analyzed to determine if one or more cylinders of the engine are misfiring, hence causing imbalance in the engine shaft rotation and corresponding imbalance in the DC link voltage. To accurately identify imbalance or aberrations in the DC link voltage signal, the signal may be analyzed only during conditions where the engine shaft speed is consistent, for example. Thus, at least in one embodiment, the conditions for diagnosing the engine may include engine speed within a range, steady-state operating conditions (e.g., engine speed and/or engine load changing by less than a threshold amount), and/or other conditions.

If the conditions for diagnosing the engine have not been met, method 400 loops back to 402 to continue monitoring operating parameters. If the conditions for diagnosing the engine have been met, method 400 proceeds to 406 to transform the generator output signal (e.g., the DC link voltage signal) into the frequency domain. Transforming the signal may include performing a fast Fourier transform on the signal, bandpass filtering the signal, or other suitable transformation. The frequency content of the signal may include a fundamental (e.g., first order) frequency and harmonics (e.g., the half-order, one and half order, second order, etc.).

At 408, method 400 includes determining a contribution to the frequency content of the DC link voltage signal by other components of the vehicle system. As used herein, "other components" of the vehicle system may include components separate from the engine, such as the inverters, that in some conditions may contribute to the frequency content of the DC link voltage signal. The "other components" may also include a contribution by the engine that is unrelated to engine imbalance, such as an increase in engine load. Under select conditions (e.g., during select modes of operation), one or more components of the engine or of the vehicle in which the engine is installed may contribute to the DC link voltage signal. When the frequency content of the voltage signal is analyzed to detect engine imbalance, for example, imbalance may be indicated if the other components are contributing to the frequency content, thus leading to false positive indications of engine imbalance or other types of degradation. Because detection of engine imbalance may lead to engine operating adjustments, including adjustment of fuel injection amounts, and in some cases may lead to engine shutdown, false positive indications of imbalance may be costly, time consuming, waste fuel, or have other consequences. Thus, as explained herein, the contribution of the other components to the frequency content may be detected, and if the contribution is above a threshold, the detection of the imbalance may be adjusted to compensate for the contribution by the other components.

One component that may contribute to the frequency content of the DC link voltage signal is an inverter. As explained above with respect to FIG. 2, an inverter is coupled between the rectifier and one or more traction motors, and acts to invert the DC voltage from the rectifier. In one example, the DC link voltage signal may be effected by the inverter base frequency. Accordingly, determining the contribution to the frequency content by another component of the vehicle includes, at 410, determining the contribution of one or more inverters based on the inverter frequency. The inverter frequency may be estimated based on the locomotive speed and/or traction motor speed. If the inverter frequency is within a threshold of the engine frequency, it may be determined that the one or more inverters are contributing to the frequency content of the DC link voltage signal. As such, when the inverter frequency is at or near the engine frequency (e.g., if the inverter frequency is within 0.5 or 1 Hz of the engine frequency), the contribution to the frequency content by the inverters may be above a threshold value.

In another example, as indicated at 412, the contribution by the one or more inverters may be determined based on one or more sideband frequencies of the engine frequency. When an engine imbalance occurs, the magnitude of the half-order frequency component of the frequency content of the DC link voltage increases. However, this effect on the DC link voltage is relatively narrow-spectrum, and thus only the half-order frequency may be affected by the imbalance. In contrast, the one or more inverters (as well as other components that contribute to the frequency content) may affect the DC link voltage in a relatively wide-spectrum manner, e.g., the contribution by the inverters is not limited to the half-order frequency. Thus, to detect the contribution to the frequency content by the inverters, the sidebands of one or more selected frequency components may be analyzed. If the sidebands are greater than a threshold, then if may be indicated that the contribution by the inverters is greater than a threshold value.

In an example, the engine may be operating at 1050 RPM, and thus the engine frequency (e.g., the engine revolution frequency) is 17.5 Hz, giving a half-order frequency of 8.75 Hz. The main peak of the half-order frequency component may be identified as a band around 8.75, such as 8.5-9, and the sidebands may be identified as frequency bands adjacent to the main peak, such as a first side band of 8-8.5, a second side band of 9-9.5, a third sideband of 7.5-8, and a fourth sideband of 9.5-10. The magnitude of each sideband may be determined, and each sideband magnitude may be summed. The sum of the magnitudes of the sidebands may be compared to a threshold magnitude. In one example, the threshold magnitude may be one-half the threshold magnitude used to determine engine imbalance (explained below). If the summed sideband magnitude is greater than the threshold, it may be indicated the inverters are contributing to the frequency content.

Other components in addition to the inverters may contribute to the frequency content of the DC link voltage signal, including generator auxiliary loads as well as fluctuations in the engine itself. Thus, as indicated at 414, determining the contribution to the frequency content by the other components may include determining if any auxiliary loads have been added during the duration of the sampling and transforming of the DC link voltage signal. The auxiliary loads may include the blower, compressor, radiator fan, additional alternator, or other component that is powered by the generator and/or contributes to the generator load or DC link voltage signal. If an auxiliary component (e.g., the blower, compressor, or radiator fan) is activated during the diagnosis, or if the load placed on the generator by the auxiliary component changes, it may be indicated that the auxiliary load is contributing to the DC link voltage signal. Further, as indicated at 416, determining the contribution to the frequency content by another component may include determining if an engine speed or load change is occurring or has occurred during the sensor sampling or transformation period. If the engine speed or load changes, it may result in a change in engine shaft speed, thus affecting the DC link voltage signal. Other sources of contribution to the DC link voltage signal frequency content are possible.

At 418, method 400 includes determining if the contribution to the frequency content by the other components is less than or equal to a threshold value. In some examples, the threshold value may be zero, such that any contribution is determined to be above the threshold value. In other examples, the threshold may be greater than zero, so that a small amount of contribution to the frequency content is deemed acceptable. It is to be understood that in some examples, the threshold value may not be numeric but instead may be a yes or no determination (e.g., if an engine load change is occurring, the contribution may be determined to be above the threshold). Further, in some examples, the threshold value may depend on the type of component contributing to the frequency content, e.g., the inverter contribution may be deemed greater than the threshold when the sideband frequency magnitudes are greater than a threshold magnitude while the auxiliary load contribution may be deemed greater than the threshold when an auxiliary load is added.

If the contribution is determined to be less than or equal to the threshold, method 400 proceeds to 420 to detect engine imbalance based on the magnitude of a peak of a selected frequency. In one example, the main peak of the half-order frequency component may be analyzed (e.g., the peak corresponding to the half-order frequency of the engine), and if the magnitude is greater than a threshold magnitude, engine imbalance may be indicated. However, other frequency components (e.g., first order, second order) may be analyzed, either alone or in combination. Other mechanisms for detecting engine imbalances based on the DC link voltage signal frequency content are possible.

Further, as explained above, rather than analyzing a single, main peak corresponding to a selected frequency component, a bucket including multiple frequencies around the selected frequency component may be analyzed, such as the frequency components in the 8.5-9 Hz range. When more than one peak is analyzed to determine imbalance, the peaks may be summed or averaged and then compared to a threshold. In one example, the mean frequency bucket sum of RMS square is compared to an imbalance threshold, and if the mean frequency bucket is greater than the imbalance threshold, imbalance may be determined. Likewise, when the sideband frequency content is analyzed to determine if the inverters or other components are contributing to the signal content, the sideband frequency bucket sum of RMS square is compared to a threshold, which in some examples may be one-half the imbalance threshold.

At 422, method 400 determines if imbalance is detected. If imbalance is detected, method 400 proceeds to 424 to adjust one or more engine operating parameters to mitigate the imbalance. The adjusting of the engine operating parameters may include adjusting a fuel injection amount to a cylinder that is determined to be misfiring (e.g., if the engine is a multi-fuel engine configured to combust gaseous and liquid fuel, the amount of liquid fuel relative to gaseous fuel may be increased in the misfiring cylinder), or all cylinders of the engine. Other engine adjustments may include adjusting fuel injection or ignition timing, valve timing, exhaust gas recirculation, boost pressure, or other parameters. Further, depending on the level of imbalance and whether it can be mitigated via engine parameter adjustments, the engine power may be derated or the engine may be shut down in some examples. Method 400 then returns.

If is determined at 422 that no imbalance is detected, method 400 proceeds to 426 to maintain current operating parameters, including maintaining fuel injection parameters (e.g., amounts, timing). Method 400 then returns.

Returning to 418, if is determined than the contribution is not less than or equal to the threshold, method 400 proceeds to 428 to adjust the detection of the engine imbalance. This may include delaying the detection until the contribution drops below the threshold, as indicated at 430. As the sources that contribute to the frequency content are typically transient, the detection of the engine imbalance may be delayed (e.g., by a predetermined amount of time or number of engine cycles) until the component is no longer contributing to the frequency content of the DC link voltage signal. In another example, the adjusting of the detection of engine imbalance may include adjusting a threshold used in the imbalance determination, as indicated at 432. As explained above at 420, engine imbalance may be indicated when the half-order frequency component (e.g., 8.75 Hz for an engine at 1050 RPM, or a mean or sum of a bucket of frequencies around a selected frequency component) is greater than a threshold magnitude (e.g., the magnitude predicted for a healthy engine). When the contribution to the frequency content by another component in the vehicle is greater than the threshold contribution value (e.g., the inverters are operating at a frequency near the engine frequency), this threshold magnitude used for determining imbalance may be increased to reduce the number of false positive imbalance detections. In this way, while more subtle engine imbalances may go undetected, at least for a duration, stronger imbalances may be detected without unnecessarily adjusting engine parameters or shutting down the engine due to false indications of imbalance. Method 400 then returns.

Thus, engine imbalance may be detected via generator output. For example, if a fuel injector is faulty or the intake or exhaust valves are degraded, incomplete combustion may occur, and hence a lower combustion torque may be produced. The sum total of these combustion torques is seen by the generator, and the generator produces an electromagnetic torque whose profile matches with the engine shaft torque. Using the generator as a sensor, faults in the system may be identified without the use of additional sensors. However, the DC link voltage sees interference from a variety of other sources including inverters, auxiliaries, alternators, engine speed shaft oscillations due to sudden load, capacitor failures, etc. These potential sources of noise may be identified and addressed to help improve the fidelity of the imbalance determination and eliminate false positives. For removing interference from the inverters, sideband frequencies may be evaluated and those signals may be eliminated when the values are beyond a threshold.

Further, in some examples, the method described above may be applied to output from other engine system sensors, such as engine speed sensors, alternator voltage sensors, or engine shaft torque sensors. Therein, sources of noise to the sensor output may be identified (e.g., inverter operation, sudden engine load changes, engagement or disengagement of auxiliary loads, etc.) and the detection of engine imbalance may be delayed until the contribution to the sensor output frequency content is below a threshold, or the engine imbalance detection may be adjusted (e.g., the threshold magnitude for indicating imbalance may be increased). For example, the inverters may contribute to a signal output by an engine shaft torque sensor, and if this contribution is determined to be above a threshold, the engine imbalance detection may be delayed, or the threshold magnitude used to determine if engine imbalance is present may be increased.

An embodiment of a system includes a generator coupled to an engine and configured to generate electricity from rotational movement of a shaft of the engine; a sensor configured to measure one or more of a parameter of generator output, engine speed, or engine shaft torque; and a controller configured to: detect engine imbalance based on a frequency content of a signal output from the sensor in response to a contribution to the frequency content from another component of the system being less than a threshold value. The controller is configured to, in response to the contribution being above the threshold value, delay the detection of the engine imbalance until the contribution is less than the threshold value. The controller is configured to, responsive to detecting engine imbalance, adjust one or more engine operating parameters.

In an example, to detect engine imbalance, the controller is configured to compare a magnitude of a selected frequency of the frequency content to a first threshold magnitude and indicate imbalance if the magnitude exceeds the first threshold magnitude. In an example, the magnitude of the selected frequency may include a summed value or a mean value of more than one frequency, such as a plurality of frequencies within a range of the selected frequency. The controller is configured to, in response to the contribution being above the threshold, adjust the detection of the engine imbalance by comparing the magnitude of the selected frequency to a second threshold magnitude, higher than the first threshold magnitude, and indicate imbalance when the magnitude exceeds the second threshold magnitude.

The system further comprises one or more traction motors driven by the generator through a rectifier that produces a DC link voltage to one or more inverters, and the sensor is configured to measure the DC link voltage as the parameter of generator output. The contribution to the frequency content by the other component of the system comprises a contribution by the one or more inverters to the frequency content of signal output by the sensor.

In one example, to determine if the contribution to the frequency content by the one or more inverters is greater than the threshold value, the controller is configured to determine an inverter frequency of each inverter and if the inverter frequency is within a threshold range of an engine rotational frequency, the controller is configured to indicate the contribution is above the threshold. In another example, to determine if the contribution to the frequency content by the one or more inverters is greater than the threshold value, the controller is configured to: identify one or more sidebands of a selected frequency of the frequency content; and if a magnitude of a sum of the one or more sidebands exceeds a threshold magnitude, indicate the one or more inverters are contributing to the frequency content.

In examples, the other component of the system comprises one or more of a generator auxiliary load or an alternator. In an example, the generator auxiliary load comprises one or more of a blower, compressor, or radiator fan. In examples, the controller is further configured to detect engine imbalance based on the frequency content of the signal output from the sensor in response to a contribution to the frequency content from a change in engine operation being less than the threshold. In an example, the system further comprises one or more traction motors driven by the generator through a rectifier that produces a DC link voltage to one or more inverters, the sensor is an engine shaft torque sensor, and the contribution to the frequency content by the other component of the system comprises a contribution by the one or more inverters to the frequency content of the signal output by the engine shaft torque sensor.

An embodiment for a method for a vehicle system includes determining a frequency content of a signal output from a sensor configured to measure a parameter of a generator coupled to an engine of the vehicle system; identifying whether a contribution to the determined frequency content by one or more vehicle system components is greater than a threshold; when the contribution is not greater than the threshold, detecting engine imbalance based on the determined frequency content, and adjusting an engine operating parameter in response to the detected engine imbalance; and when the threshold is greater than the threshold, adjusting the detecting of the engine imbalance based on the determined frequency content. In an example, adjusting the detecting of the engine imbalance based on the determined frequency content comprises delaying the detecting of the engine imbalance until the contribution is not greater than the threshold.

In one example, detecting engine imbalance based on the determined frequency content comprises comparing a magnitude of a selected frequency of the frequency content to a first threshold magnitude and indicating imbalance if the magnitude exceeds the first threshold magnitude. Adjusting the detecting of the engine imbalance based on the determined frequency content comprises adjusting the first threshold magnitude to a second, higher threshold magnitude. In examples, the one or more vehicle system components comprise one or more of an inverter, an alternator, and a generator auxiliary load.

An embodiment relates to a system, including an engine having a plurality of cylinders; a generator coupled to the engine and configured to generate electricity from rotational movement of a shaft of the engine; one or more traction motors driven by the generator through a rectifier that produces a DC link voltage to one or more inverters; a sensor configured to measure the DC link voltage; and a controller. The controller is configured to: identify one or more sidebands of a selected frequency of frequency content of a signal output by the sensor; when a first magnitude of a sum of the one or more sidebands exceeds a first threshold magnitude, indicate the one or more inverters are contributing to the frequency content of the signal output by the sensor; and when the first magnitude does not exceed the first threshold magnitude, indicate engine imbalance based on a second magnitude of the selected frequency exceeding a second threshold.

In an example, the controller is configured to, responsive to indicating the one or more inverters are contributing to the frequency content, delay the indication of engine imbalance until the first magnitude drops below the first threshold magnitude. The controller is configured to, responsive to indicating engine imbalance, adjust one or more engine operating parameters.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
    a generator coupled to an engine and configured to generate electricity from rotational movement of a shaft of the engine;
    one or more traction motors driven by the generator through a rectifier that produces a DC link voltage to one or more inverters;
    a sensor configured to measure the DC link voltage; and
    a controller configured to:
        detect engine imbalance based on a frequency content of a signal output from the sensor in response to a contribution to the frequency content from the one or more inverters being less than a threshold value, including determining an inverter frequency of each inverter and, if the inverter frequency is within a threshold range of an engine rotational frequency, indicating the contribution is above the threshold value.

2. The system of claim 1, wherein the controller is configured to, in response to the contribution being above the threshold value, delay the detection of the engine imbalance until the contribution is less than the threshold value.

3. The system of claim 1, wherein to detect engine imbalance, the controller is configured to compare a magnitude of a selected frequency of the frequency content to a first threshold magnitude and indicate engine imbalance if the magnitude exceeds the first threshold magnitude.

4. The system of claim 3, wherein the controller is configured to, in response to the contribution being above the threshold, adjust the detection of the engine imbalance by comparing the magnitude of the selected frequency to a second threshold magnitude, higher than the first threshold magnitude, and indicate imbalance when the magnitude exceeds the second threshold magnitude.

5. The system of claim 1, wherein to determine if the contribution to the frequency content by the one or more inverters is greater than the threshold value, the controller is configured to:
    identify one or more sidebands of a selected frequency of the frequency content; and
    if a magnitude of a sum of the one or more sidebands exceeds a threshold magnitude, indicate the one or more inverters are contributing to the frequency content.

6. The system of claim 1, wherein the controller is further configured to detect engine imbalance based on the frequency content of the signal output from the sensor in response to a contribution to the frequency content from a change in engine operation being less than the threshold value.

7. The system of claim 1, wherein the controller is configured to, responsive to detecting engine imbalance, adjust one or more engine operating parameters.

8. A method for a vehicle system, comprising:
    determining a frequency content of a signal output from a sensor configured to measure a parameter of a generator coupled to an engine of the vehicle system;
    identifying whether a contribution to the determined frequency content by one or more vehicle system components at one or more selected frequencies is greater than a threshold;
    when the contribution is not greater than the threshold, detecting engine imbalance based on the one or more selected frequencies of the determined frequency content, and adjusting an engine operating parameter in response to the detected engine imbalance; and when the contribution is greater than the threshold, adjusting the detecting of the engine imbalance based on the one or more selected frequencies of the determined frequency content.

9. The method of claim 8, wherein adjusting the detecting of the engine imbalance based on the determined frequency content comprises delaying the detecting of the engine imbalance until the contribution is not greater than the threshold, and wherein the one or more vehicle system components comprise one or more of an inverter, an alternator, or a generator auxiliary load.

10. The method of claim 8, wherein detecting engine imbalance based on the determined frequency content comprises comparing a magnitude of the one or more selected frequencies of the frequency content to a first threshold magnitude and indicating engine imbalance if the magnitude exceeds the first threshold magnitude.

11. The method of claim 10, wherein adjusting the detecting of the engine imbalance based on the determined frequency content comprises adjusting the first threshold magnitude to a second, higher threshold magnitude.

12. The method of claim 8, wherein the one or more vehicle system components comprise an inverter, and wherein identifying whether the contribution to the determined frequency content by the one or more vehicle system components at the one or more selected frequencies is greater than the threshold includes identifying whether a frequency of the inverter is within a threshold range of an engine frequency.

13. A system, comprising:
an engine having a plurality of cylinders;
a generator coupled to the engine and configured to generate electricity from rotational movement of a shaft of the engine;
one or more traction motors driven by the generator through a rectifier that produces a DC link voltage to one or more inverters;
a sensor configured to measure the DC link voltage; and
a controller configured to:
identify one or more sidebands of a selected frequency of frequency content of a signal output by the sensor;
when a first magnitude of a sum of the one or more sidebands exceeds a first threshold magnitude, indicate the one or more inverters are contributing to the frequency content of the signal output by the sensor; and
when the first magnitude does not exceed the first threshold magnitude, indicate engine imbalance based on a second magnitude of the selected frequency exceeding a second threshold magnitude.

14. The system of claim 13, wherein the controller is configured to, responsive to indicating the one or more inverters are contributing to the frequency content, delay the indication of engine imbalance until the first magnitude drops below the first threshold magnitude.

15. The system of claim 13, wherein the controller is configured to, responsive to indicating engine imbalance, adjust one or more engine operating parameters.

* * * * *